Dec. 13, 1966     P. T. ISBELL ETAL     3,291,535
COTTON PICKER AND FAN ASSEMBLY THEREFOR
Filed June 1, 1964     3 Sheets-Sheet 1
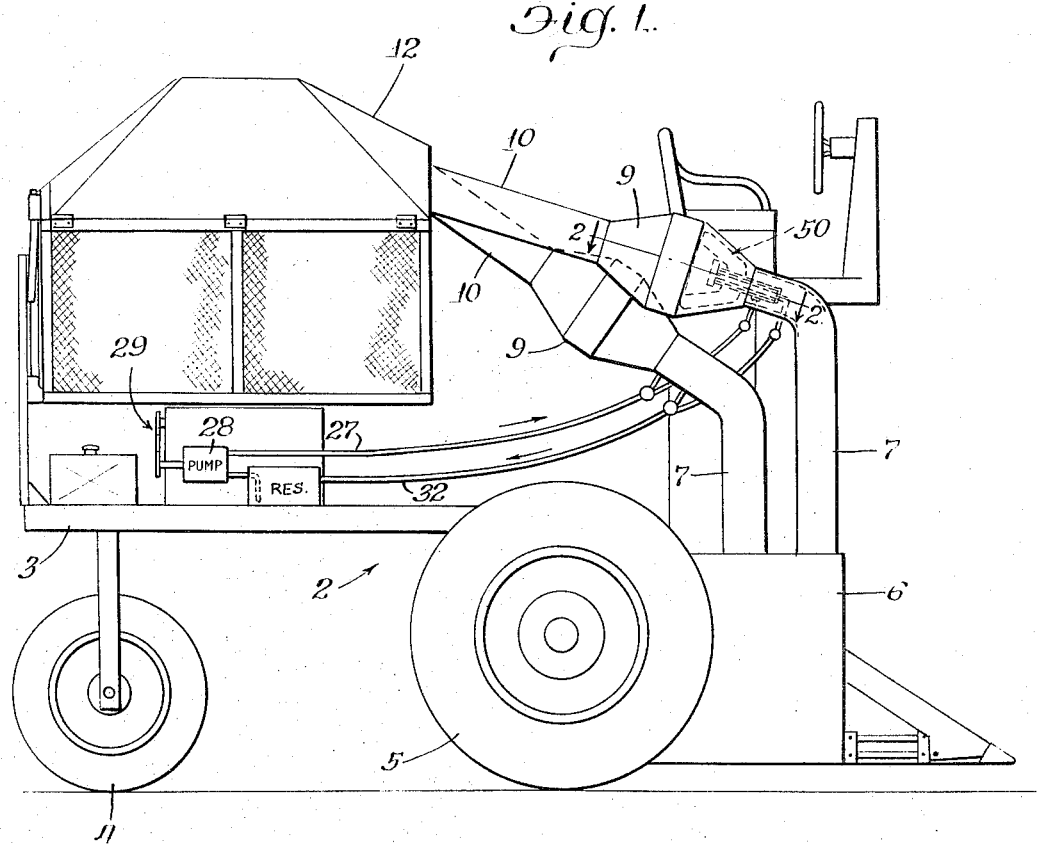
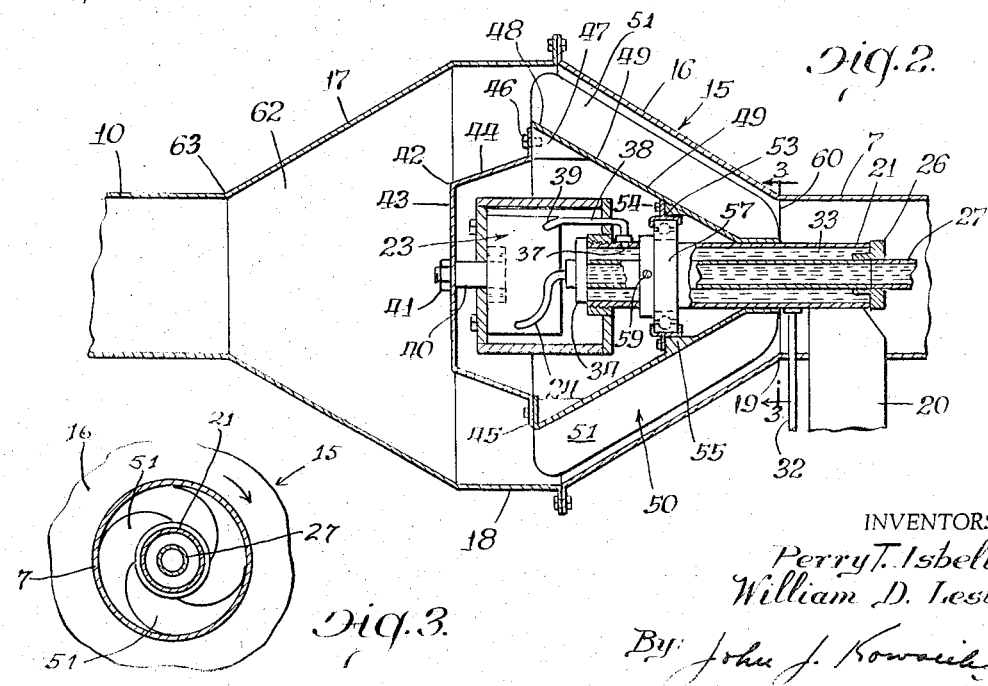
INVENTORS
Perry T. Isbell
William D. Lesler
By John J. Kowack, Atty.

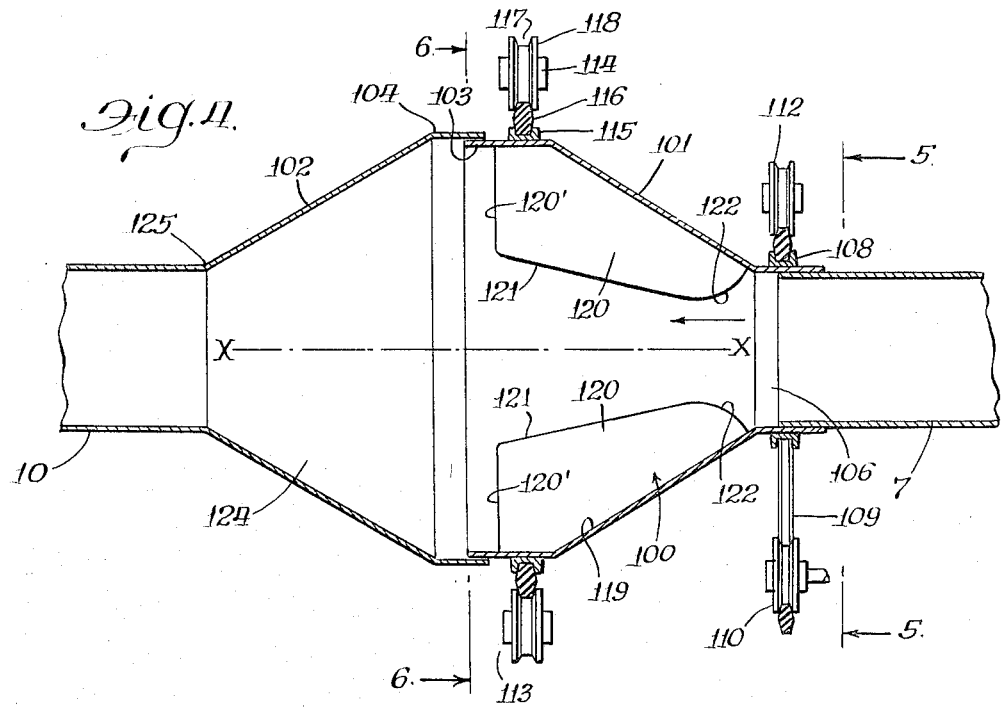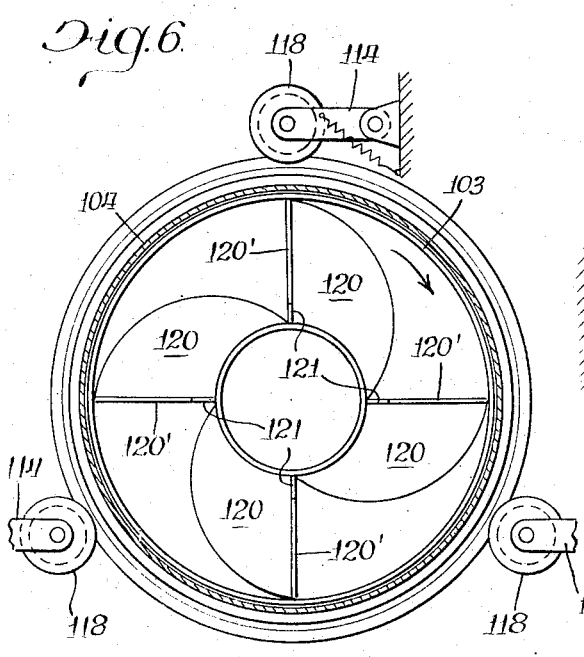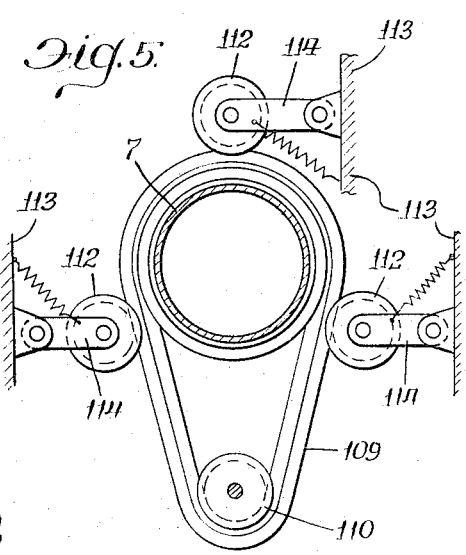

Dec. 13, 1966  P. T. ISBELL ET AL  3,291,535
COTTON PICKER AND FAN ASSEMBLY THEREFOR
Filed June 1, 1964  3 Sheets-Sheet 3

INVENTORS.
Perry T. Isbell
William D. Lester
By John J. Kowalik, Atty.

United States Patent Office 3,291,535
Patented Dec. 13, 1966

3,291,535
COTTON PICKER AND FAN ASSEMBLY
THEREFOR
Perry T. Isbell and William D. Lester, Memphis, Tenn.,
assignors to International Harvester Company, Chicago, Ill., a corporation of Delaware
Filed June 1, 1964, Ser. No. 371,691
8 Claims. (Cl. 302—37)

This invention relates to cotton pickers and more specifically to the conveying mechanism for elevating cotton from the picker units to the storage basket.

In providing a conveying system for a cotton picker, it is of utmost importance that, in addition to conveying a clean cotton sample, the conveyor be of adequate capacity and at the same time handle the seed cotton gently so as to prevent seed cracking. The seeds removed from the cotton are part of the crop harvest and also cracking of seeds contributes to staining of the lint and consequent low grading of the fiber.

In cotton pickers of current construction, it has been found that the air system for handling cotton between the picker and the basket or receptacle is most feasible. There is, however, one serious drawback in this system in that the fans as heretofore designed required an inordinate or disproportionate amount of power in operation.

It is a general object of the invention to provide a novel fan structure adapted for incorporation in present cotton pickers which will operate efficiently and at high capacity and with minimum power requirement.

A further object of the invention is to provide a novel fan assembly for a cotton harvester comprising fan structure which is incorporated into the conveyor duct of current cotton harvesters.

A further object of the invention is to provide a novel axial flow fan structure wherein a plurality of fan blades are mounted within a tubular enclosure which forms a continuation of the duct work, the fan blades defining a central eye within which the cotton is entrained as it is delivered or moved axially to the duct with minimal impingement against the blades and only at areas of low velocity.

A further object of the invention is to provide a novel fan structure which is simple to manufacture and which is of rugged construction and in which the drive is substantially coaxial with the conveyor duct.

These and other objects of the invention will become more apparent from the specification and the drawings wherein:

FIGURE 1 is a side elevational view of a cotton harvester incorporating one form of the invention;

FIGURE 2 is an axial sectional view through one of the fan assemblies taken substantially on the line 2—2 of FIGURE 1;

FIGURE 3 is a cross-sectional view on line 3—3 of FIGURE 2;

FIGURE 4 is an axial sectional view of another form of the invention comparable to FIGURE 2;

FIGURE 5 is a cross-sectional view taken substantially on the line 5—5 of FIGURE 4;

FIGURE 6 is a further cross-sectional view taken substantially on the line 6—6 of FIGURE 4;

Figure 7:
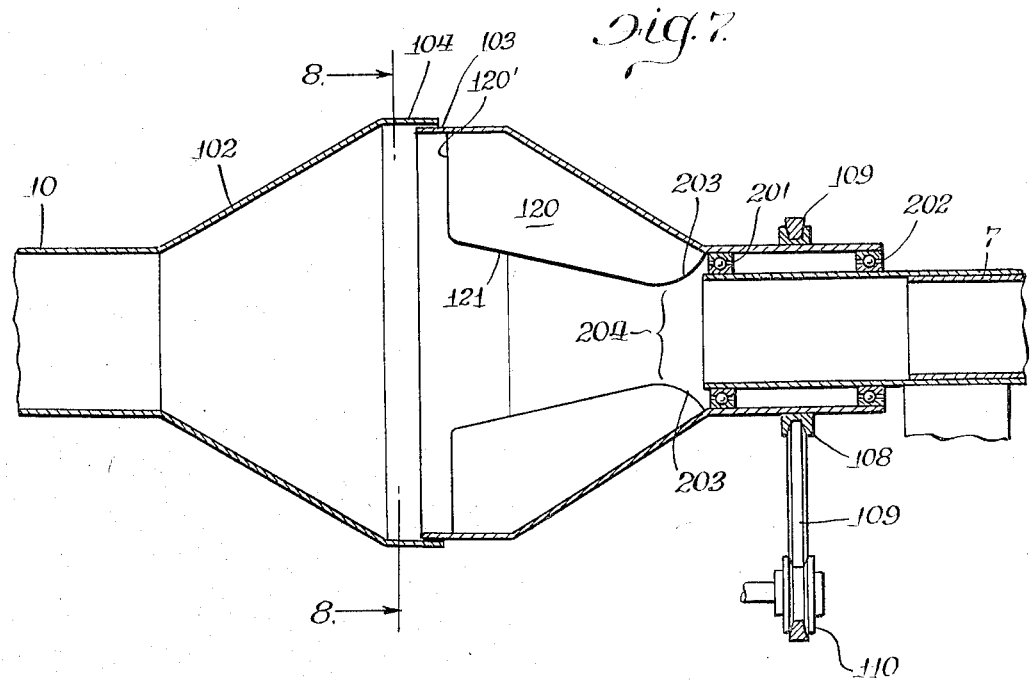
FIGURE 7 is an axial sectional view of the further embodiment of the invention.

Describing the invention in detail and having particular reference to FIGURES 1–3 of the drawings, there is shown a conventional cotton picker generally designated 2 which incorporates a wheeled framework 3 having a rear steering wheel assembly 4 and front traction wheels 5 between and ahead of which there is supported the cotton picker mechanism generally designated 6. This picker is substantially or essentially the same as shown in U.S. Patent No. 2,140,631 and includes front and rear crop or cotton discharge conduits having inlet or delivery portions 7 and 7, each conduit portion 7 being connected to a fan assembly 9. This fan assembly 9 discharge through the outlet or discharge tubes or duct 10, 10, into the basket 12 which is suitably mounted upon the framework 3, as is well known to those skilled in the art.

Referring now to the fan assembly 9, it comprises a shell 15 of fusiform shape including a pair of frusto-conical end portions 16 and 17 which at their base ends 16', 17' are inter-connected by a cylindrical intervening portion 18. The conical portion 16 is connected at its apex 19 to the associated inlet pipe 7 which is provided with a suitable mounting structure 20 on which is mounted and secured one end of a cylindrical tube 21 which is disposed substantially coaxial with the inlet tube 7. The tube 21 extends into the cone 16 and at its opposite end mounts a frame 22 which carries a hydraulic motor 23, said hydraulic motor being connected through a hydraulic fluid or supply line or inlet pipe 24 to a source of supply, said inlet pipe 24 being disposed coaxially with the tube 21 and extending through a plug 26 in the outer end of the tube 21 and through suitable aperture 27 in the mounting block 20. The supply line 27 is connected to a delivery pump 28 which is suitably connected to the power source or engine 29 diagrammatically shown mounted on the frame structure 3. The pump has a suction side connected through a conduit 30 to a reservoir 31 also mounted on the framework 3, said reservoir being connected to the fluid return line 32, which return line 32 is connected to the interior of the tube or bore 33 of the tube 21, the bore 31 being closed by a plug 34 at the inner end of the tubes 21, and said plug 34 admitting through a sealed aperture 35 a portion of the beforementioned supply line 24. The tube or bore 33 communicates through outlet port 37 with a branch line 38 which is suitably connected to the outlet port 39 of the hydraulic motor 23.

The hydraulic motor 23 is provided with a driving shaft 40 which is connected as by screw and thread assembly 41 to a mounting structure 42 which comprises an annular plate 43 and a frusto-conical peripheral annulus 44, said annulus 44 having a ring portion 45 which is secured by cap screws 46 to the mounting blocks or pads 47 which are integrally united to the base end 48 of a conical core 49 of the fan generally designated 50. The fan 50, in addition to the conical core 49 which is concentric with the cone portion 16, is provided with outwardly extending fan blades 51 which are spiralled opposite to the direction of rotation, each blade covering substantially 90°. The fan is additionally supported on the mounting tube 21 by means of a ring 53 which is suitably secured by cap screws 54 to mounting pads 55 which are integrally secured to the interior of the conical portion 49. The ring 53 is mounted on a bearing 57 which is suitably sleeved over and secured as by a locking screw 59 to the tube 21. It will be appreciated that rotation of the fan 50 will create a low pressure area at the inlet end 60 of the fan assembly and that the cotton entrained in the inlet pipe 7 will be carried past the fan blades into the exhaust chamber 62 of the fan assembly, the exhaust chamber being defined by the cylindrical portion 18 as well as the frusto-conical portion 20 which at its apex 63 communicates with the exhaust pipe 10.

Referring now to the embodiment shown in FIGURES 4–6, wherein parts corresponding to those in the previous embodiment are identified by the same reference numerals, it will be seen that the fan assembly generally designated 100 has a pair of telescoping end portions 101 and 102, the end portions 101 and 102 both being generally of frusto-conical form and the end portion 101 having an annular or cylindrical inner end portion 103 which telescopes into a similar inner end portion 104 which is on the inner end of the conicial portion 102. The conical portion 101 has an inlet section 106 which is of tubular form preferably cylindrical in shape and which telescopes over the inlet pipe 7. The portion 106 is provided on its external side with a pulley 108 integral therewith, the pulley having a V-shaped groove which admits a V-belt 109 suitably trained about a driven pulley 110 whereby the shell 101 is adapted to be driven. The end portion 106 of the shell 101 is journalled via the belt 109 to a support 113 through a plurality of suitable pulleys 112 which are biased from supports 113 by suitable spring structures 114. It will be seen that the belt is somewhat diamond-shaped or double V-shaped in cross section.

The cylindrical portion 103 of the revolving shell 101 is provided externally with a grooved pulley 115 which admits one side of the double-V belt 116, the other edge of the double-V belt entering into grooves 117 in a plurality of encompassing pulleys or journals 118 which are suitably mounted on the associated support 114. The interior 119 of the shell 101 is provided with radial inwardly extending fan blades 120 which have a 90° axial wrap about the axis of the fan assembly, said blades having trailing substantially radial edges 120′ which merge into axial edges 121, said edges 121 converging toward the axis X—X of the fan assembly and at their leading ends remote from the edges 120 being curved radially outwardly as at 122 to provide a smooth obstruction-free profile to the flow of material as it is moving in the direction of the arrow from the inlet pipe 7 into the fan and then into the exhaust chamber 124 which is formed by the stationary conical housing portions 102 and 104, said housing portion 102 tapering and merging into a vertex 125 communicating with the outlet pipe 10.

Figure 8:
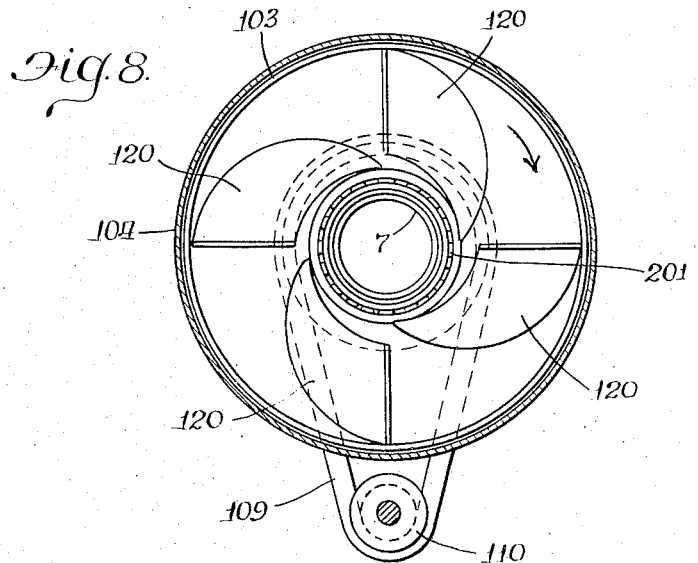
FIGURE 8 is a cross-sectional view taken substantially on the line 8—8 of FIGURE 7.

Referring now to the embodiment of the invention shown in FIGURES 7 and 8 wherein parts identical to those in the previous embodiment are identified by corresponding reference numerals, the axial portion 106a corresponds with the portion 106 in the previous embodiment, except that it is extended considerably in axial length and on its inner surface 200 provides a bearing for the spaced ball bearing means 201 and 202 which are sleeved over and mounted on the inlet pipe 7. It will be seen that as in the previous embodiment, the low-speed at tips 203 of the blades, which in part define the eye 204 of the fan, prevents seed cracking. The fan in this particular instance has an open eye to provide free flow of air and material. The support for the fan is cantilevered and the drive is transmitted through the pulley 108.

It will be realized that several novel embodiments of the invention have been disclosed and that each fan assembly is arranged coaxially with the conveyor tubing to obtain an axial flow of air in each instance. The leading edges of the fan blades are minimized to obtain a relatively slow speed and present a smooth contour for the flow of material therealong to prevent hitting the material such as cotton and cracking the seeds.

Various other forms of the invention will become readily apparent to those skilled in the art within the scope of the appended claims.

What is claimed is:

1. In a pneumatic conveying device for a cotton harvester of the type having a conveyor duct including delivery and discharge portions, a fan assembly connected therebetween comprising a housing including a pair of frusto-conical sections having base ends in adjacent relation and vertices connected to respective duct portions and an impeller means including fan blades mounted within one of said frusto-conical sections and rotatable to provide a vacuum in said delivery portion of the duct and said impeller means comprising a support within said one section, a conical core rotatably mounted within said one section and congruent therewith, and said blades mounted on said core between the same and said one section, and said support comprising a hollow fluid-carrying member, a hydraulic motor mounted on said member and connected to the core for driving the latter and fluid lines for said motor extending through the support.

2. In a pneumatic conveying device for a cotton harvester of the type having a conveyor duct including delivery and discharge portions, a fan assembly connected therebetween comprising a housing including a pair of frusto-conical sections having base ends in adjacent relation and vertices connected to respective duct portions and an impeller means including fan blades mounted within one of said frusto-conical sections and rotatable to provide a vacuum in said delivery portion of the duct and one of said sections of the fan housing rotatable coaxially with respect to the other, and said fan blades connected to the one section and projecting inwardly therefrom and providing an eye coaxial with said housing.

3. In a pneumatic conveying device for a cotton harvester of the type having a conveyor duct including delivery and discharge portions, a fan assembly connected therebetween comprising a housing including a pair of frusto-conical sections having base ends in adjacent relation and vertices connected to respective duct portions and an impeller means including fan blades mounted within one of said frusto-conical sections and rotatable to provide a vacuum in said delivery portion of the duct and one of said sections rotatable coaxially with respect to the other section and having internal fan blades spiralled in the direction of rotation.

4. In a pneumatic conveying device for a cotton harvester of the type having a conveyor duct including delivery and discharge portions, a fan assembly connected therebetween comprising a housing including a pair of frusto-conical sections having base ends in adjacent relation and vertices connected to respective duct portions and an impeller means including fan blades mounted within one of said frusto-conical sections and rotatable to provide a vacuum in said delivery portion of the duct and one of said sections rotatable coaxially with respect to the other section and having internal fan blades spiralled opposite to the direction of rotation, and said blades having leading edges flaring in the direction toward the delivery portion of the duct.

5. In a pneumatic conveyor for a cotton harvester having a conveying duct including inlet and outlet sections and an intervening fan assembly, said assembly comprising a housing having a pair of frusto-conical halves having base ends in adjacent relation and having vertices communicatively connected to respective duct sections, each half having a generally cylindrical extension at its base end in telescoping relation with the extension of the other half, and fan blades on the one half adjacent to the inlet section, said blades having inner edges converging toward the axis of the housing in the direction of the inlet and terminating in leading tips providing low-speed material impingement surfaces.

6. The invention according to claim 5 and said one half having a coaxial extension telescoped over said inlet section and journalled thereon, and means driving said one half through said extension.

7. In a pneumatic conveyor for a cotton harvester having a conveyor duct with inlet and outlet portions and an intervening fan assembly, said assembly having a housing fusiform in cross-section, and fan means within the housing coaxial with the duct and said housing divided into two sections, one adjacent to each duct portion, the housing adjacent to the inlet portion rotatable with respect thereto and the other section, and a plurality of fan blades within the rotatable housing extending radially inwardly therefrom an tapering radially toward the inlet portion.

8. In a pneumatic conveyor for a cotton harvester having a conveyor duct with inlet and outlet portions and an intervening fan assembly, said assembly having a housing fusiform in cross-section, and fan means within the housing coaxial with the duct and said housing having a section adjacent the inlet portion rotatable with respect thereto and having fan blades connected thereto and rotatable therewith and presenting radial edges remote from the inlet portion and having axially directed edges converging from the radial edges toward the axis of rotation of the portion in the direction toward the inlet portion.

References Cited by the Examiner

UNITED STATES PATENTS

| | | | |
|---|---|---|---|
| 1,348,829 | 8/1920 | Gabel et al. | 302—37 |
| 2,499,693 | 3/1950 | Stanton | 302—58 |
| 2,500,400 | 3/1950 | Cogswell | 103—87 |
| 2,812,896 | 11/1957 | Sieradzki | 230—117 |
| 3,102,679 | 9/1963 | Rudy | 230—117 |

ANDRES H. NIELSEN, *Primary Examiner.*

EVON C. BLUNK, *Examiner.*